United States Patent [19]

Lebkuchner

[11] 4,404,483
[45] Sep. 13, 1983

[54] METHOD OF FABRICATING A WET-ROTOR CIRCULATOR AND CIRCULATOR PRODUCED THEREBY

[75] Inventor: Benno Lebkuchner, Warwick, R.I.
[73] Assignee: Taco, Inc., Cranston, R.I.
[21] Appl. No.: 238,459
[22] Filed: Feb. 26, 1981
[51] Int. Cl.[1] .......................................... H02K 15/00
[52] U.S. Cl. ..................................... 310/42; 310/86; 310/87; 310/90
[58] Field of Search ....................... 310/42, 44, 72, 85, 310/86, 87, 88, 89, 90, 261; 72/707, 56; 29/421 M

[56] References Cited

U.S. PATENT DOCUMENTS

| | | | |
|---|---|---|---|
| 2,976,907 | 3/1961 | Harvey et al. | 29/421 M X |
| 2,993,131 | 7/1961 | Trevitt | 310/86 |
| 3,088,200 | 5/1963 | Birdsall et al. | 29/421 M X |
| 3,126,937 | 3/1964 | Brower et al. | 29/421 M X |
| 3,144,585 | 12/1963 | Brower et al. | 29/421 M X |
| 3,195,335 | 7/1965 | Brower et al. | 29/421 M X |
| 3,196,529 | 7/1965 | Schwinghamer | 29/421 M X |
| 3,210,842 | 10/1965 | Schwinghamer | 29/421 M X |
| 3,222,771 | 12/1965 | Schwinghamer | 29/421 M X |
| 3,231,842 | 1/1966 | Brower et al. | 29/421 M X |
| 3,264,653 | 8/1966 | Lebkuchner | 310/54 |
| 3,432,700 | 3/1969 | Diederichs | 310/42 |
| 3,497,735 | 2/1970 | Diederichs et al. | 310/42 |
| 3,508,327 | 4/1970 | Diederichs et al. | 310/42 |
| 3,555,651 | 1/1971 | Latussek et al. | 310/42 X |
| 3,571,921 | 3/1971 | Pieper | 310/42 |
| 3,590,464 | 7/1971 | Wildi | 25/421 M |
| 3,604,088 | 9/1971 | Turner | 29/421 M |
| 3,837,755 | 9/1974 | Benoit et al. | 29/516 |
| 3,911,300 | 10/1975 | Lebkuchner | 310/86 |
| 4,023,261 | 5/1977 | Piete | 310/86 |
| 4,048,717 | 9/1977 | Piette | 310/42 |

OTHER PUBLICATIONS

Magneform ® Brochure and Bulletin Nos. 1201R, 1202, 1502R, 1510R, 1511R, 1513R, from Maxwell Laboratories, Inc., 8835 Balboa Avenue, San Diego, California 92123, 10/76.

"Evolution in the Forming and Assembly of Metal Parts With Magneform", by Guenter Zittel, Mgr. Maxwell Laboratories, Inc., a technical paper published by the Society of Manufacturing Engineers, Dearborn, Michigan, 1975.

"Getting the Most Out of Electromagnetic Metal Forming", by Guenter Zittel, Mgr. Magneform Engineering, Maxwell Laboratories, Inc., an article appearing in *Assembly Engineering*, Sep. 1976.

"Electromagnetic Metalforming", Robert N. Stauffer, Sr. Associate Director, article appearing in *Manufacturing Engineering*, Feb. 1978.

*Primary Examiner*—Roland Skudy
*Attorney, Agent, or Firm*—Lane, Aitken & Kananen

[57] ABSTRACT

A wet-rotor circulator in accordance with the present invention includes a drive motor coupled to the impeller of a fluid pump. The drive motor includes a rotor assembly enclosed within a fluid impermeable jacket and a stator assembly for driving the rotor. The rotor is coaxially supported within the jacket by bearings which are permanently secured in place by circumferentially crimping sections of the jacket radially inwardly to shape-lock the bearings to the jacket. The crimping takes place during an assembly step in which an applied magnetic field causes substantially instantaneous deformation of the jacket without disturbing the coaxial relationship between the rotor shaft and its support bearings.

12 Claims, 8 Drawing Figures

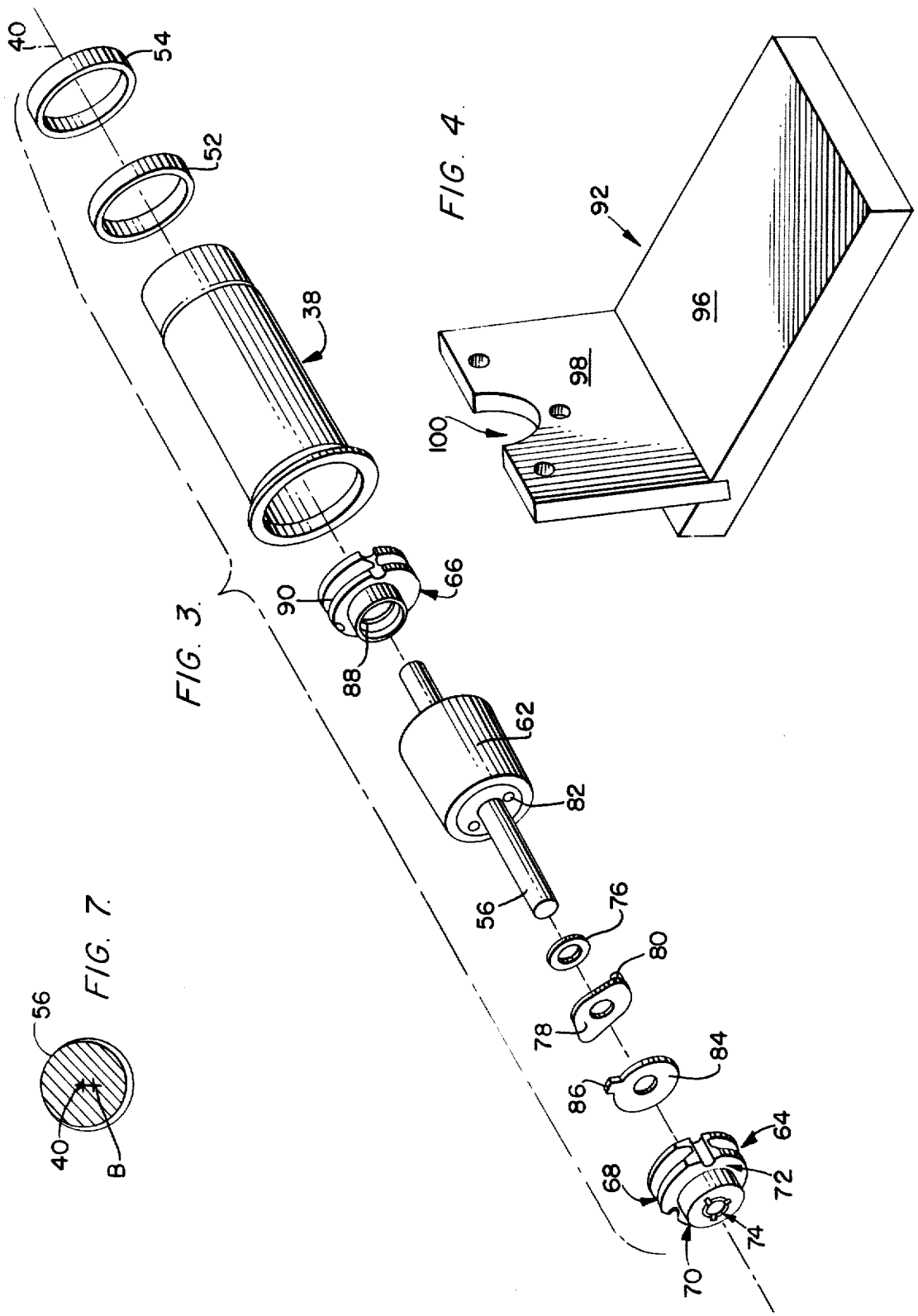

METHOD OF FABRICATING A WET-ROTOR CIRCULATOR AND CIRCULATOR PRODUCED THEREBY

CROSS REFERENCE TO RELATED PATENTS

The subject matter of the present invention is related to that disclosed in U.S. Pat. Nos. 3,911,300; 4,023,261; and 4,048,717.

BACKGROUND OF THE INVENTION

The present invention relates to wet-rotor circulators and, more specifically, to improved rotor assemblies and methods of fabrication thereof for use in wet-rotor circulators.

Wet-rotor circulators are motor/pump combinations in which the motor rotor is connected directly to the pump impeller and rotates in the pumped fluid. Typically, the circulator includes a pump housing with an impeller rotatably mounted in a pumping chamber with the impeller connected directly to the rotor shaft. The rotor assembly is typically supported in sleeve bearings and is mounted within a fluid impermeable jacket that is sealed against the pump housing so that the rotor is surrounded by and rotates in the pumped fluid during its operation but is otherwise fluid isolated from the stator assembly by the fluid impermeable jacket. The jacket is typically fabricated from a low-permeability material and is mounted within the motor stator so that the rotating magnetic field provided by the stator assembly passes through the jacket wall to cause rotation of the rotor and the connected pump impeller. Circulators of this type are typically used in circulating hot water in home heating systems as well as other applications.

Since the rotor and connected impeller are the only moving parts in the wet-rotor circulator, the operating life of the circulator is a function of the operating life of the bearings that support the rotor shaft. One of the factors that affects bearing life in the wet rotor environment is the axial alignment between the axes of the sleeve bearings that support the rotor shaft and the axis of the rotor shaft. Preferably, the axes of the support bearings should be parallel (that is, coaxial) with the axis of the rotor shaft, since a skewed axial relationship can diminish bearing life. In general, it is possible to economically manufacture the rotor, the support bearings, and the jacket to tolerances which nominally provide the desired axial alignment between the rotor and the bearings. However, problems have been encountered in the past in attempting to affix or otherwise secure the support bearings in place within the jacket to provide a finished circulator having the desired bearing-to-shaft axial alignments. Since the jacket is typically fabricated as a cup-like, deepdrawn, thin-shell component and, accordingly, has limited structural rigidity, bearing retaining techniques which involve the application of a force against the jacket are generally unsuitable. For example, crimping the exterior shell of the jacket to the bearings is generally not successful since the very nature of the crimping operation, i.e., the forcible application of a crimping tool to the jacket, causes distortion of the jacket so that it is difficult to establish and maintain the desired parallel alignment between the axis of the rotor shaft and the axes of its support bearings. Accordingly, crimped-jacket rotor assemblies can be prone to premature bearing failures.

In the past, the problem of affixing the bearings in place within the jacket has been met by applying a curable cement to appropriate locations in the interior of the jacket, inserting the rotor and assembled bearings into the jacket, establishing the desired axial relationships with the aid of an assembly jig, and then curing the cement to achieve the permanent assembly. Since this method does not involve the application of force to the as-manufactured piece-parts, the cemented bearing method does provide a finished circulator having the desired axial relationships. However, problems have been encountered with this type of assembly. As a practical matter, substantial variations in cement performance can occur because of run-to-run manufacturing variations and because of temperature and humidity changes during the preparation of the cement and its application to the bearings. Also, the cement must be cured over a period of time, which curing period is relatively greater than conventional mechanical fabrication techniques.

Accordingly, there is a need for an inexpensive assembly method for establishing the desired parallel axis relationship between the rotor shaft and its support bearings and for quickly securing the rotor bearings in place within the jacket in such a manner that the so-established relationship between the rotor shaft and its bearings will not be adversely affected.

SUMMARY OF THE INVENTION

In view of the above, it is an overall object of the present invention, among others, to provide a wet-rotor circulator which possesses long term operational reliability.

It is another object of the present invention to provide a rotor assembly for a wet-rotor circulator in which the rotor assembly can be quickly assembled to and secured in place in the jacket so that the coaxial relationship between the rotor shaft and its support bearings is maintained during the securing operation to minimize bearing failures due to misaligned bearings.

It is another object of the present invention to provide a method for assembling the rotor components of a wet-rotor circulator to their mating jacket and securing the rotor assembly thereto in a time-efficient economical manner.

In accordance with these objects, and others, the present invention provides a wet-rotor circulator and method therefor having a wet rotor assembly that includes a rotor mounted on a shaft journalled within bearings with the rotor and bearings inserted within a fluid impermeable jacket. The bearings are then aligned relative to the rotor shaft so that the respective axes are parallel, and the jacket is uniformly deformed in a radially inward direction in response to an externally applied magnetic field concentrated axially at the location of the bearings to crimp or clamp the bearings in place. The magnetic deformation is substantially instantaneous and provides the desired crimping effect without disturbing or adversely affecting the pre-established relationship between the rotor and its support bearings.

In those cases where the jacket is fabricated from a material having a relatively low electrical conductivity so that it is insufficiently responsive to the applied magnetic field, circumferential driving rings fabricated from a material having a relatively high electrical conductivity are mounted on the jacket in axial registration with the support bearings. The applied magnetic field acts on the rings to cause them to collapse inwardly to impact a surface portion of the jacket, deforming it radially to effect the desired crimping.

The so-assembled rotor is economical to produce in that the securing of the bearings to the jacket is substantially instantaneous without gross distortion of the jacket or loss of the desired coaxial relationship between the rotor and the jacket or between the rotor shaft and its support bearings.

BRIEF DESCRIPTION OF THE DRAWINGS

The above description, as well as the objects, features, and advantages of the present invention will be more fully appreciated by reference to the following detailed description of a presently preferred but nonetheless illustrative embodiment in accordance with the present invention when taken in conjunction with the accompanying drawings wherein:

FIG. 3 is an exploded perspective view of the rotor assembly of FIG. 2;

FIG. 4 is a perspective view of a mounting fixture for assembling the rotor assembly shown in FIGS. 2 and 3;

FIG. 7 schematically illustrates the manner by which the rotor support bearing self-aligns on the rotor shaft.

DESCRIPTION OF THE PREFERRED EMBODIMENT

Figure 1:
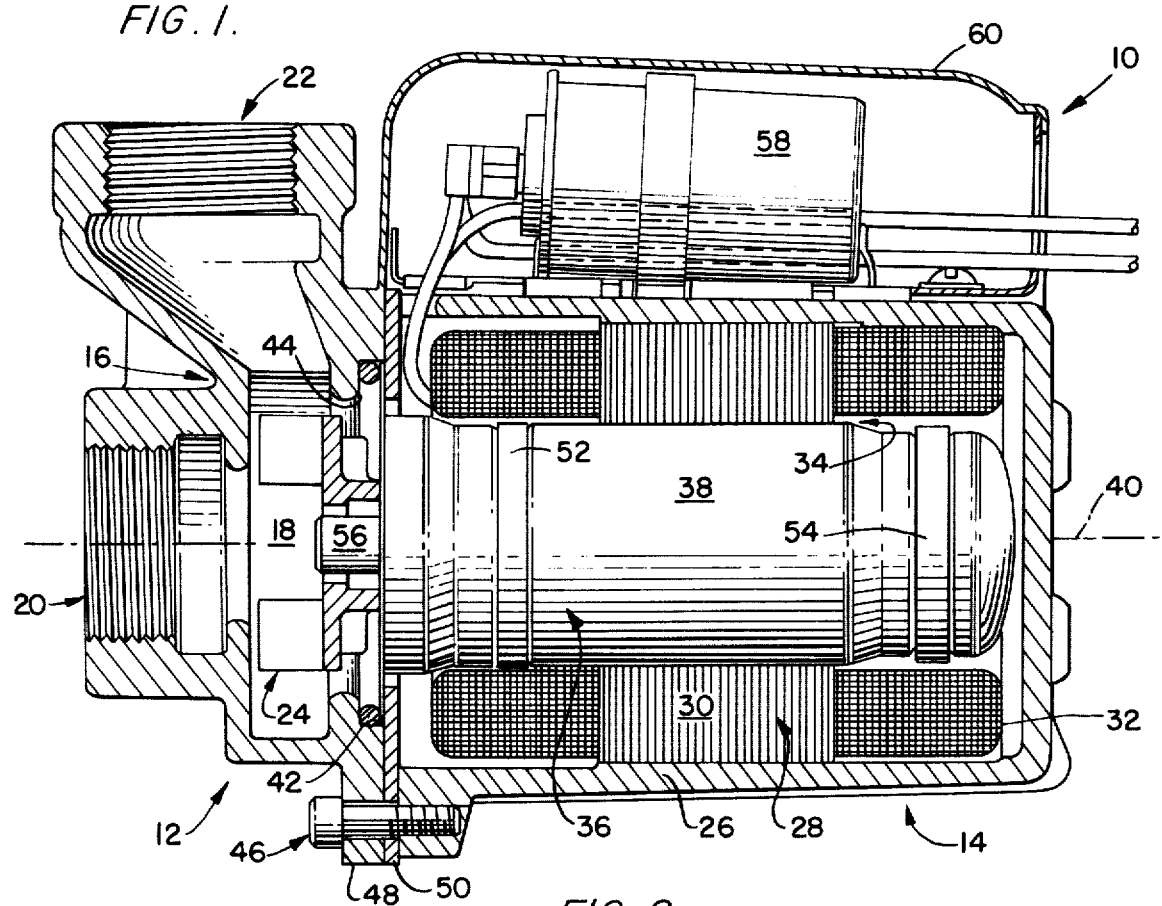
FIG. 1 is a cross-sectional view of a wet rotor circulator in accordance with the present invention.

A wet rotor circulator in accordance with the present invention is shown in cross section in FIG. 1 and is generally referred to therein by the reference character 10. The circulator 10 is divided into a pump portion 12 and a drive motor portion 14. The pump portion 12 includes a pump housing 16 that defines a pumping chamber 18, a threaded fluid inlet 20, a threaded fluid outlet 22, and an impeller 24 rotatably mounted within the pumping chamber 18. The drive motor portion 14 includes a motor housing 26 having a stator assembly 28 mounted therein and retained in place in a conventional manner. The stator assembly 28 includes a laminated stack 30 and associated field windings 32 with the stack defining a rotor-receiving opening 34. A wet rotor assembly, generally designated by the reference character 36, is located within the central opening 34 of the stack 30 and includes an exterior, thin-walled cartridge or jacket 38 (FIG. 2) that is formed as a surface of revolution about the rotor axis 40. The jacket 38 is defined, starting from the left in FIGS. 1 and 2, by a radially extending flange 38a which defines the open end side of the jacket 38, a first cylindrical portion 38b, a first frusto-conical transition portion 38c, an intermediate cylindrical portion 38d, a second frusto-conical transition portion 38e, another cylindrical portion 38f, and a dome-shaped end wall 38g which defines the closed-end of the jacket 38. The jacket 38 is preferably deepdrawn as a thin-shell, unitary piece from a material that is corrosion resistant to the fluid being pumped and has a low magnetic permeability, for example, austenitic stainless steel. The jacket 38 is sealed on the pump housing 16 by an elastomer "O" ring 42 (FIG. 1) located between the flange 38a and the bottom surface 44 of a recess formed within the pump housing 16. The pump housing 16 and the drive motor housing 26 are secured together by a plurality of threaded fasteners 46 that extend through a flange 48 in the pump housing 16, through clearance holes in an intermediate mounting plate 50 and into threaded bores formed in the motor housing 26. The intermediate mounting plate 50 maintains the flange 38a of the jacket 38 against the "O" ring 42. Two driving rings 52 and 54, the function and purpose of which are described more fully below, are mounted, respectively, on the cylindrical surface portions 38d and 38f of the jacket 38. A drive shaft 56 extends from the open-end of the jacket 38 and is secured to the impeller 24 located in the pumping chamber 18. When the impeller 24 is caused to rotate in response to rotation of the shaft 56, fluid is drawn into the inlet 20 and delivered through the outlet 22 under pressure.

The drive motor 14 is of the split-phase type, preferably the permanent capacitor type, and to that end, the motor is provided with a capacitor 58 contained within a housing 60 with electrical wires connected between the stator windings 32, the capacitor 58, and the power source (not shown) as is conventional.

Figure 2:
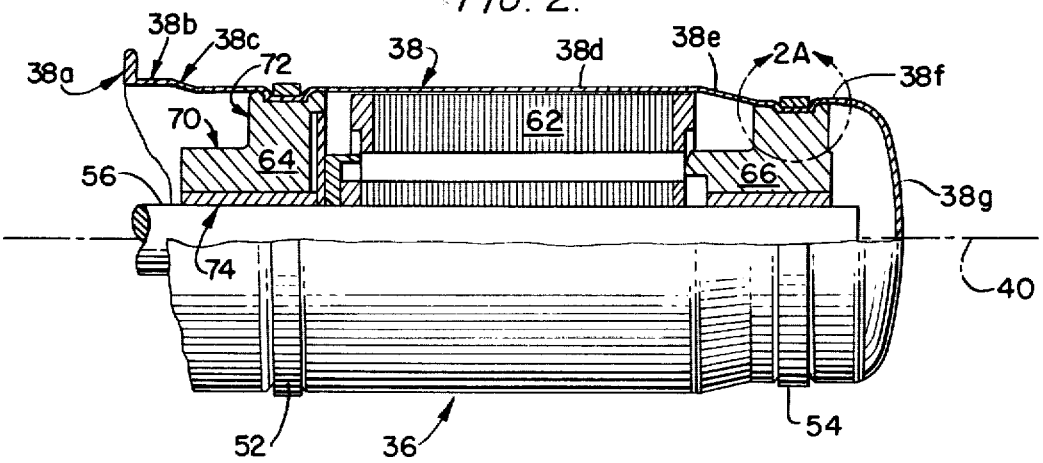
FIG. 2 is a partial cross-sectional view of the rotor assembly of the wet rotor circulator shown in FIG. 1.
Figure 2A:
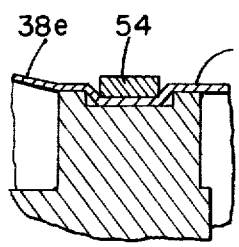
FIG. 2A is a detailed view of a bearing support member secured in place in the rotor assembly shown in FIG. 2.

A greater understanding of the structure of the rotor assembly 36 may be had by a consideration of FIGS. 2, 2A, and 3. As is shown in FIGS. 2 and 3, the rotor assembly 36 includes a rotor 62 mounted on the shaft 56. The rotor 62 is of conventional design in that it is fabricated from a laminated stack and includes short circuiting conductors, for example, a copper sheath. Front and rear bearing supports 64 and 66 are journalled to the ends of the shaft 56 that extend outwardly from the stack with the forward end of the shaft secured to the impeller 24 as described above.

The front bearing support 64 is located between the impeller 24 and the rotor 62 and is formed generally as a body of revolution about the axis 40 and includes an outside diameter surface appropriately sized to permit a clearance fit between the outside diameter of the bearing support 64 and the inside diameter of the cylindrical portion 38d of the jacket 38. In accordance with one feature of the invention, the outside diameter surface of the bearing support 64 is provided with a surface irregularity, such as a circumferential recess or groove 68, as shown in more detail in FIGS. 2A and 3. An axially directed extension 70 is provided on the forwardly facing surface 72 of the bearing support 64, and a hollow, cylindrical sleeve bearing 74 is fitted within an appropriately sized bore formed in the support 64. The sleeve bearing 74 journals the drive shaft 56 with a close running fit and is of the type that is resistant to corrosion from the pumped fluid and preferably lubricated by the pumped fluid, e.g., a sintered carbon bearing.

A thrust receiving washer 76, preferably made from a suitable elastomer material, is located on the rotor shaft 56 adjacent the forward surface of the rotor 62 with an apertured thrust plate 78 mounted on the shaft 56 forwardly of and adjacent to the thrust receiving washer 76. The thrust plate 78 includes a rearwardly extending tab or lug 80 adapted to fit within a tab receiving opening 82 formed in the rotor 62 so that the thrust receiving washer 78 rotates with the rotor 62. Another apertured thrust receiving plate 84 is mounted on the shaft forwardly of and adjacent to the thrust plate 78. This latter thrust receiving plate 84 includes a radially extending tab 86 that is adapted to fit within a tab-receiving groove (not shown) on the rearwardly facing side of the forward bearing support 64.

The rearwardly located bearing support 66 is located on the opposite side of the rotor from the bearing support 64 and is also formed as a body of revolution about the axis 40 with the outside diameter surface appropriately sized to permit a clearance fit between the rear bearing support 66 and the inside diameter surface of the cylindrical portion 38f of the jacket 38. An axially extending portion is provided on the forwardly facing surface of the rear bearing support 66 and a sleeve bearing 88, similar in structure to the front sleeve bearing 74, is fitted in an appropriately sized bore in the rear bearing support. Both the front and rear bearing supports 64 and 66 include axially directed through holes that permit unrestricted passage of the pumped fluid from one side of the bearing support to the other. As in the case of the front bearing support 64, the rear bearing support 66 includes a surface irregularity, such as a circumferential groove 90 for securing the bearing support 66 to the jacket as described more fully below.

The various rotor parts described above are retained within the jacket 38 by the action of the driving rings 52 and 54 mounted on the outside diameter surface of the jacket 38 on the cylindrical portions 38d and 38f, respectively, in axial registration with the grooves 68 and 90 on the front and rear bearing support members 64 and 66. As explained more fully below, the driving rings 52 and 54 are deformed radially inward by magnetic deformation to press a surface portion of the jacket 38 immediately beneath and adjacent to the respective driving rings 52 and 54 into the grooves 68 and 90 of the bearing supports 64 and 66 to permanently shape- or form-lock the bearing supports 64 and 66 in place within the jacket 38, as shown in more detail in FIG. 2A.

Figure 5:
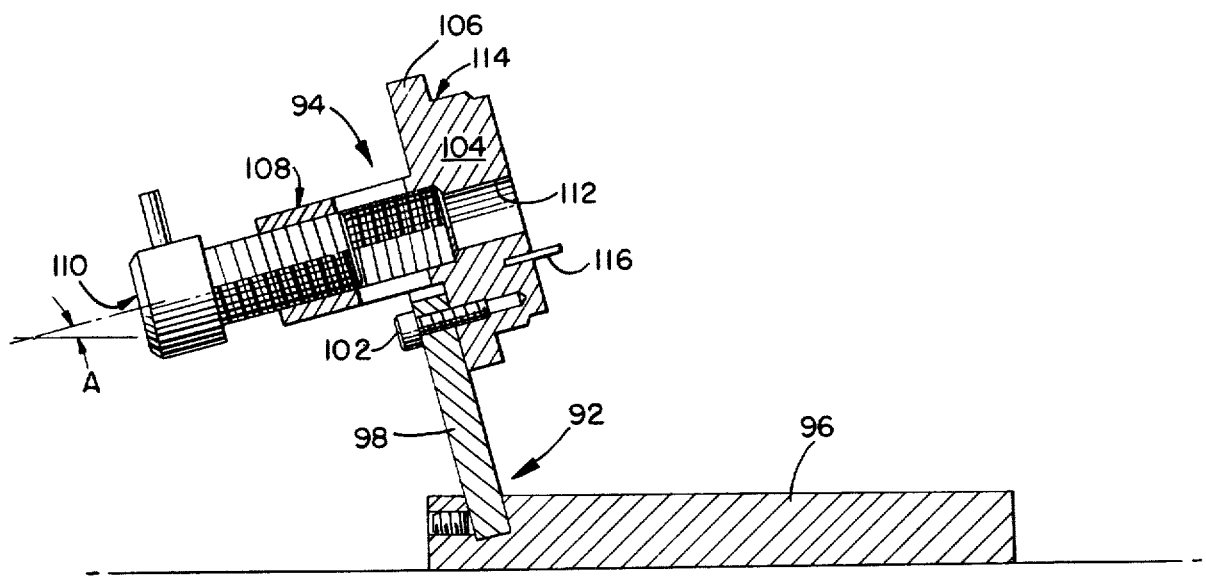
FIG. 5 is a cross-sectional view of an axial adjustment tool for use with the support fixtures of FIG. 4 in assembling the rotor structure in FIGS. 2 and 3.

The rotor assembly 36 may be fabricated using the assembly fixture 92 shown in FIG. 4 and the axial alignment tool 94 shown in FIG. 5. The assembly fixture 92 includes a generally planar base plate 96 with a support plate 98 secured to the top of the base plate and aligned at an angle relative thereto as shown in FIG. 5. The support plate 98 is provided with a semi-circular opening 100 (FIG. 4) for receiving the axial alignment tool 94 using suitable threaded fasteners.

The alignment tool 94 is secured to the support plate 98 by threaded fasteners 102 and includes an arbor 104 formed as a body of revolution about an axis and a flange 106 that extends radially outward from the arbor. A hollow axially directed portion 108 extends from the flange 106 and is provided with an internal bore that includes a threaded portion for receiving a threaded adjusting screw 110 and an unthreaded portion that functions as a pilot hole 112 for the rotor shaft 56 as described below. The arbor 104 includes an outside diameter surface 114 on the side opposite from the extension 108 for receiving the jacket 38. A support bearing alignment pin 116 is secured to and axially extends from the arbor 104.

Figure 6:
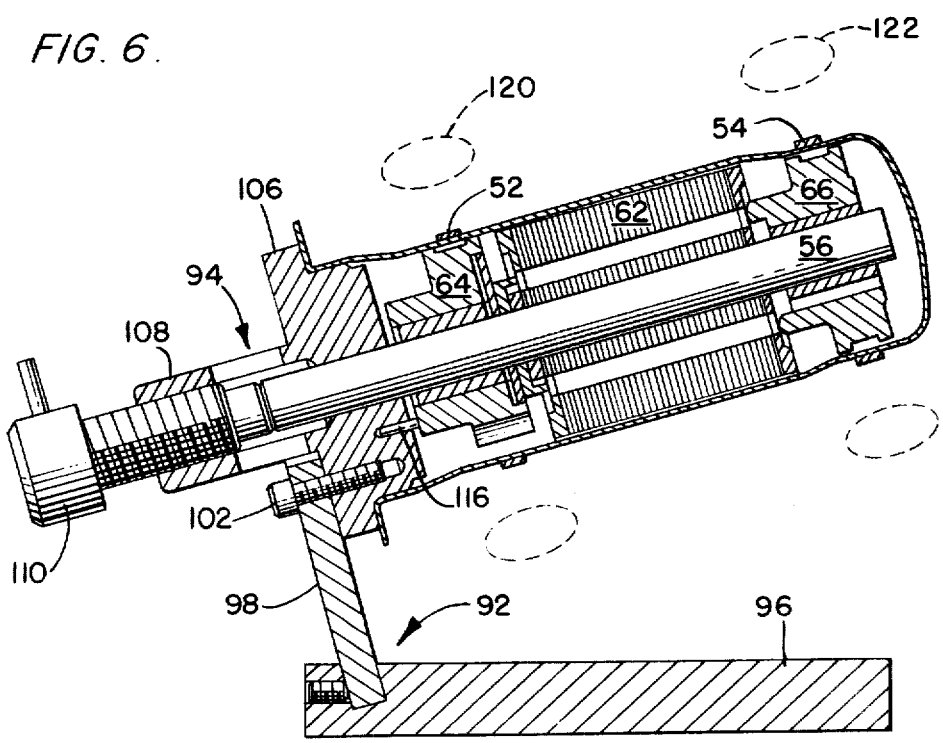
FIG. 6 is a cross-sectional view of a rotor assembly of FIGS. 2 and 3 shown in position on the support fixture of FIG. 3 and positioned by the adjusting tool of FIG. 5 with coils for forming a magnetic field shown in broken line illustration.

In assembling the rotor assembly 36 using the assembly fixture 92 and the alignment tool 94, the various component parts that constitute the rotor assembly 36 are assembled as shown in FIGS. 3 and 6 and as discussed above. The rotor shaft 56 is inserted into the pilot hole 112 with the front bearing support 64 contacting the end of the alignment pin 116 so that the alignment pin 116 establishes the desired position of the forward bearing support 64. The jacket 38 is mounted over the assembled rotor parts with the jacket piloting itself on the surface 114 and against the flange 106 as indicated in FIG. 6. The adjustment screw 110, which is initially in a retracted position prior to the mounting of the aforedescribed parts, is then advanced to contact the end of the rotor shaft 56 and then further advanced (e.g. one-quarter or one-half of a turn) to establish the desired position of the rear bearing support 66 and the axial clearance between the thrust receiving plates 78 and 84.

The assembly fixture 92 is designed to hold the rotor shaft 56 at a 13°–22° angle from the horizontal with the preferred holding angle between 15° and 18°. In this attitude range, the mass, center of gravity, and the friction between the various parts will cause the front bearing support 64 to self-align relative to the shaft 56 as it rests against the end of the alignment pin 116 and the rear bearing support 66 to likewise self-align on the support shaft 56 as it rests against the end of the rotor stack 62 so that the axes of the bearing 74 in the front bearing support 64 and the bearing 88 in the rear bearing support 66 are parallel to the axis of the shaft 56. An appreciation of this self-aligning feature may be had by a consideration of FIG. 7 which schematically illustrates the end portion of the rotor shaft 56 in cross section and the inner confronting surface of a support bearing as a circle. In practice, the outside diameter of the support shaft 56 is somewhat smaller than the inside diameter of the support bearing to define and establish a running fit therebetween. When the parts are mounted on the assembly fixture 92 as shown in FIG. 6, the force of gravity pulls the bearing against the shaft 56 so that there is a line of contact on the upper portion of the shaft and the bearing self-aligns to the shaft 56 so that the bearing axis B is parallel to the axis 40 of the shaft, as shown in FIG. 7. The bearing axis B is displaced somewhat from the axis 40 of the support shaft 56 by an amount approximately one-half the design clearance between the two parts.

One the piece parts that define the rotor assembly are mounted on the assembly fixture 92 so that the aforedescribed self-alignment takes place, the driving rings, 52 and 54, which are preferably fabricated from aluminum and are designed to be slip-fitted on the cylindrical portions 38d and 38f of the jacket 38, are mounted on the jacket and aligned in axial registration with the grooves 68 and 90 of the support bearings 64 and 66.

The crimping operation is effected by exposing the driving rings 52 and 54 to a concentrated ciircumferential magnetic field which generates an inwardly directed uniform pressure pulse that exceeds the yield strength of the driving rings 52 and 54 to drive the rings radially inward. The driving rings 52 and 54, as they are driven radially inward, impact and deform the portions of the jacket walls 38d and 38f immediately below and adjacent the respective driving rings and force these deformed portions into the grooves 68 and 90 of the bearing supports 64 and 66 to shape- or form-lock the bearing supports in place as shown in FIG. 2A. The crimping operation, under the influence of the applied magnetic field, is essentially instantaneous so that there is little time for disturbing or adversely affecting the pre-crimp relationship between the rotor shaft 56 axis and its support bearings 74 and 88 axes. Since the applied magnetic field causes the driving rings 52 and 54 to be driven substantially instantaneously and circumferentially inward, it has been discovered that there is insufficient time to cause skewing or tilting of the bearings 74 and 88 relative to the shaft 56. Accordingly, coaxiality of the rotor shaft relation to the support bearings is desirably maintained as contrasted to conventional mechanical crimping operations, and premature bearing failure caused by skewed bearings is thereby minimized.

Once the crimping operation is completed, the driving rings 52 and 54 may be left in place, or, if preferred, removed by conventional machining operations.

The magnetic field is applied by positioning of the assembled rotor as shown in FIG. 6 adjacent magnetic-field applying coils 120 and 122 (schematically represented in broken line illustration) that immediately surround and are spaced from the driving rings 52 and 54. The magnetic coils 120 and 122 are connected to a source of energy, such as a charged capacitor. When the capacitor is discharged through the coils 120 and 122, an intense magnetic field is formed which causes the generation of crimping forces about the circumference of each of the driving rings 52 and 54 to cause the desired crimping. Commercially available machines for generating the necessary crimping forces are manufactured by Maxwell Laboratories of San Diego, Ca., and are marketed under trademark "Magnaform" and described in Maxwell Laboratories' bulletins 1201 R and 1202.

The instantaneous crimping of the driving rings overcomes the disadvantages associated with the prior cementing of the bearing supports, such as the variation in the manufactured quality of the bonding agent and the variables associated with the preparation and application of the bonding agent.

The assembly fixture 92 and the alignment tool 94 are exemplary only and, as can be appreciated by those skilled in the art, the fixture and tool can be modified or alternate structure(s) provided to permit assembly line or fully automated fabrication of the rotor assembly. In the embodiment described above, the jacket 38 is disclosed as fabricated from austenitic stainless steel, which metal is insufficiently responsive to magnetic field deformation to effect the desired crimping; accordingly, the driving rings 52 and 54 are provided to assist in effecting the crimping. As can be readily appreciated, the driving rings can be dispensed with when using materials for the jacket that are sufficiently responsive to magnetic field deformation. Additionally, the angular range of 15°–22° described above for causing the desirable self-alignment of the bearings to the support shaft is a function of the physical structure of the parts involved. As can be appreciated, this angular range may differ, either increasing or decreasing, for differently designed parts.

As can be appreciated from the above, various modifications may be made to the present invention without departing from the spirit and scope thereof as defined in the appended claims and their legal equivalent.

What is claimed is:

1. A wet rotor assembly for a wet rotor pump, said assembly comprising:
   a rotor having a core secured to a shaft for rotation therewith about an axis;
   bearings journalled to said shaft to permit rotation of said rotor about said axis;
   a fluid impermeable jacket with an open end and a closed end fabricated from a material of low magnetic permeability, said rotor and bearings located within said jacket with said bearings supported against an inside diameter surface of said jacket;
   circumferential rings mounted about the outer diameter surface of said jacket in axial registration with said bearings within said jacket, said circumferential rings having been driven uniformly circumferentially inward by application of an applied magnetic field to circumferentially clamp said bearings in place in said jacket, said jacket having a surface structure at a location of said bearings which is structurally defined during the magnetic field application to said circumferential rings to secure the jacket to said bearings.

2. The assembly claimed in claim 1 wherein:
   said core is formed as a cylindrical body of revolution about said axis and said shaft extends outwardly from the ends of said body, a bearing journalled on each end of said shaft.

3. The assembly claimed in claim 2 wherein:
   said bearings include a cylindrical outside diameter surface in contact with the inside diameter surface portion of said jacket, said cylindrical outside diameter surface portion of said bearings including surface irregularities to enhance clamping of said bearings to said jacket.

4. The assembly claimed in claim 2 wherein said bearings each include a cylindrical outside diameter surface portion in contact with the inside diameter surface portion of said jacket, said cylindrical outside diameter surface portion of said bearings having a circumferential groove formed therein, said rings applying a circumferential pressure to the wall of said jacket causing a surface portion of said jacket wall to enter said grooves to shape-lock said bearings to said jacket.

5. The assembly claimed in claim 1 wherein:
   said bearings include a cylindrical outside diameter surface portion in contact with said inside diameter surface portion of said jacket, said cylindrical outside diameter surface portion of said bearings including surface irregularities to enhance clamping of said bearings to said jacket.

6. The assembly claimed in claim 1 wherein:
   said bearings each include a cylindrical outside diameter surface portion having a circumferential groove formed thereon, the clamping pressure applied by said rings during the application of said magnetic field causing a surface portion of said jacket to enter said groove to shape-lock said bearings to said jacket.

7. A wet rotor assembly for a wet rotor pump, said assembly comprising:
   a rotor having a core secured to a shaft for rotation therewith about an axis;
   bearings journalled to said shaft to permit rotation of said rotor about said axis;
   a fluid impermeable jacket with an open and a closed end fabricated from a material of low magnetic permeability, said rotor and bearings located within said jacket with said bearings supported against the inside diameter surface of said jacket to maintain said rotor substantially coaxial with said jacket;
   circumferential bearing-clamping bands mounted on the exterior surface of said jacket in axial registration with said bearings and dimensioned to apply a circumferentially inward force at least during the application of a magnetic filed to said bands and the portion of the jacket adjacent thereto to clamp said bearings in place against an inner wall portion of said jacket.

8. The assembly claimed in claim 7 wherein:

said core is formed as a cylindrical body of revolution about said axis and said shaft extends outwardly from the ends of said cylindrical body, a bearing journalled to each end of said shaft.

9. The assembly claimed in claim 8 wherein:

said bearings each include a cylindrical outside diameter surface in contact with the inside diameter surface of said jacket, said cylindrical outside diameter surface of said bearings including surface irregularities to enhance clamping of said bearings to said jacket.

10. The assembly claimed in claim 8 wherein:

said bearings each include a cylindrical outside diameter surface portion having a circumferential groove formed thereon, the clamping pressure applied by said clamping bands during application of said magnetic field causing a surface portion of said jacket to enter said grooves to shape-lock said jacket to said bearing.

11. The assembly claimed in claim 7 wherein said bearings each include a cylindrical outside diameter surface portion in contact with an inside diameter surface portion of said jacket, said cylindrical outside diameter surface portion including surface irregularities to enhance the clamping of said bearings to said jacket.

12. The assembly claimed in claim 7 wherein said bearings each include a cylindrical outside diameter surface having a circumferential groove formed therein, the clamping pressure applied by said clamping bands causing a surface portion of said jacket to enter said grooves to shape-lock said bearings to said jacket.

* * * * *